Patented Oct. 28, 1958

2,858,317

PROCESS FOR PREPARING ISONICOTINIC ACID DIETHYLAMIDE

Gino Carrara, Milan, Italy, assignor to Lepetit S. p. A., Milan, Italy

No Drawing. Application October 19, 1954
Serial No. 463,312

Claims priority, application Great Britain
October 22, 1953

1 Claim. (Cl. 260—295)

This invention relates to a process for the manufacture of substituted isonicotinic acid amides and to the products which are obtained by such process.

More particularly, the invention relates to the production of isonicotinic acid amides of the formula

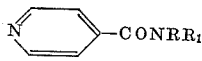

wherein R represents hydrogen, or a normal or branched lower alkyl or aralkyl radical; $R_1$ represents a normal or branched lower alkyl or aralkyl radical and may be identical with or different from R; or $NRR_1$ represents a morpholine or a piperidine ring.

The compounds of the above general formula are structurally related with known compounds possessing cardiovascular activity, as for example nicotinic acid diethylamide (Wolbe, Archiv der Pharmazie, 263, 471, 1921). We have now found that our new compounds possess a marked cardiovascular activity, so as to be preferable in many ways to a number of drugs now commercially available.

More particularly, the activity of $N_1N$-diethyl-isonicotinamide excels that of the most commonly used analeptic drugs in experimental animals.

In accordance with our invention, substituted isonicotinic acid amides having the above formula are prepared by heating isonicotinic acid with an amine of the formula HNR and phosphorus oxychloride at a temperature exceeding 100° C.

Preferably the process is effected by directly adding to isonicotinic acid one equivalent of the amine, and then adding to the resulting mixture about 0.5 to 1.2 equivalents of phosphorus oxychloride at a temperature between 100 and 150° C., preferably between 115 and 130° C. for 1–24 hours in the absence of a solvent. The mixture is then diluted with water, and the product, after the solution has been made alkaline with an alkali metal hydroxide or carbonate, is extracted with an organic solvent substantially immiscible with water.

Although the products are usually obtained as clear yellowish oils, which may sometimes be purified by fractional distillation, some of them crystallize on prolonged standing at room temperature. They may be clinically used as such or in the form of their quaternary salts, such as hydrohalides, alkyl halides, sulphates and so on.

The invention is illustrated by the following examples.

Example 1

To 61.5 g. isonicotinic acid, 16.5 g. anhydrous 100% diethylamine are added dropwise in 15 minutes. The temperature of the mixture rises slowly to about 50° C. 92 g. phosphorus oxychloride are then added while cooling the reaction flask externally in an ice bath, then it is warmed on an oil bath until the internal temperature of the mixture reaches 130° C. This temperature is maintained for 8 hours. After cooling to room temperature, the mass is poured onto 300 g. crushed ice, made alkaline with sodium carbonate and extracted with five 200 ml. portions of ethyl ether, the solvent removed in vacuo and the residual oil is distilled at 119–120° C. under 1 mm. pressure. The product is a yellowish oil fairly soluble in water.

$n_D^{20}$: 1.525; yield 72 g. (81% of the theoretical amount) of isonicotinic acid diethylamide of the formula

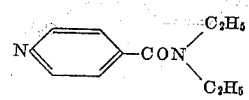

Example 2

To 24.6 g. isonicotinic acid are rapidly added 26 g. dl-1-phenyl-2-aminopropane; the temperature rises slowly to about 60° C. After spontaneous cooling to room temperature, 36.8 g. phosphorus oxychloride are added in one portion. The mixture is heated on an oil bath; at about 110° C. a spontaneous reaction starts with strong evolution of hydrochloric acid. The oil bath is removed, and the internal temperature of the mass rises to about 140° C. Once the spontaneous reaction has subsided, the mixture is again heated on the oil bath to 120–140° C. for 4 hours under stirring. After cooling, 130 ml. of water are added, and the resulting solution is made alkaline with a saturated aqueous sodium carbonate solution. An oil separates, which gradually crystallizes. It is extracted with six 200 ml. portions of ethyl ether, the ether extract is concentrated to a small volume and cooled. A white crystal mass separates, which is collected in vacuo and dried. M. P. 112–113° C.; on recrystallization from benzene the M. P. rises to 114° C. Yield 41 g. (84% of the theoretical amount) of dl-1-phenyl-2-isonicotinamidopropane of the formula

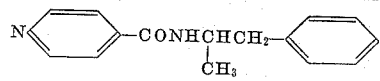

Example 3

12.3 g. isonicotinic acid and 8.7 g. morpholine are thoroughly mixed, then 7.7 g. phosphorus oxychloride are added dropwise, constantly stirring the mass by hand. The resulting pasty mixture is then heated on an oil bath to 115–130° C., and this temperature is maintained for 16 hours. After cooling, 50 ml. water are added and the reddish solution is made alkaline by adding an aqueous 40% sodium carbonate solution. The solution is extracted with five 80 ml. portions of ethyl ether, the solvent is removed by distillation and the oily residue is cooled in an ice bath. After a long time (7–12 hours) the oil becomes a solid brittle mass, which is powdered in a mortar. M. P. 73–74° C. Yield 12 g. (62% of the theoretical amount) of 4-isonicotinyl morpholine of the formula

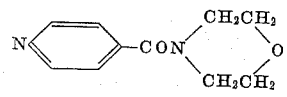

Example 4

12.3 g. isonicotinic acid and 8.5 g. piperidine are thoroughly mixed, then 7.7 g. phosphorus oxychloride are added dropwise, constantly stirring and shaking the mass. The resulting pasty mixture is then heated on an oil bath at 115–130° C., and this temperature is maintained for 12 hours. After cooling 70 ml. water are added and the resulting solution is made alkaline by adding cautiously an aqueous 10% sodium hydroxide solution. The solution is extracted with seven 80 ml. portions of ethyl ether, the solvent is removed by distillation and the oily residue is cooled in an ice bath. After 5–6 hours the oil begins to crystallize. M. P. 66–68° C. Yield 10 g. (53% of the theoretical amount) of 1-isonicotinyl piperidine of formula

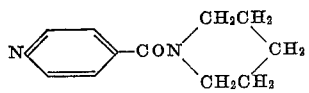

What we claim is:

Process for preparing isonicotinic acid diethylamide of formula

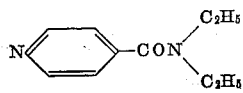

which comprises heating a mixture of one mole of isonicotinic acid and about one mole of diethylamine with about 1.2 moles of phosphorus oxychloride to 130° for 8 hours.

References Cited in the file of this patent

Uhlmann: Zeitschrift für die gesamte Experimentelle Medizin, vol. 43, pages 556–83, abstracted in Beilstein's Handbook, 4th ed., vol. 22, 2nd Supp., page 37 (1924).

Pictet et al.: Archives des Sciences (Geneva) [4] vol. 5, pages 113–28, abstracted in Beilstein's Handbook, 4th ed., vol. 22, page 40 (1897).

Prideaux: Textbook of Inorg. Chem., vol. 6, part 2, pages 97–8 (1934).